March 8, 1966 W. J. SACKETT, SR 3,239,314
AMMONIATOR-GRANULATOR SYSTEM FOR SEPARATING
CLASSES OF GRANULES
Original Filed March 6, 1961
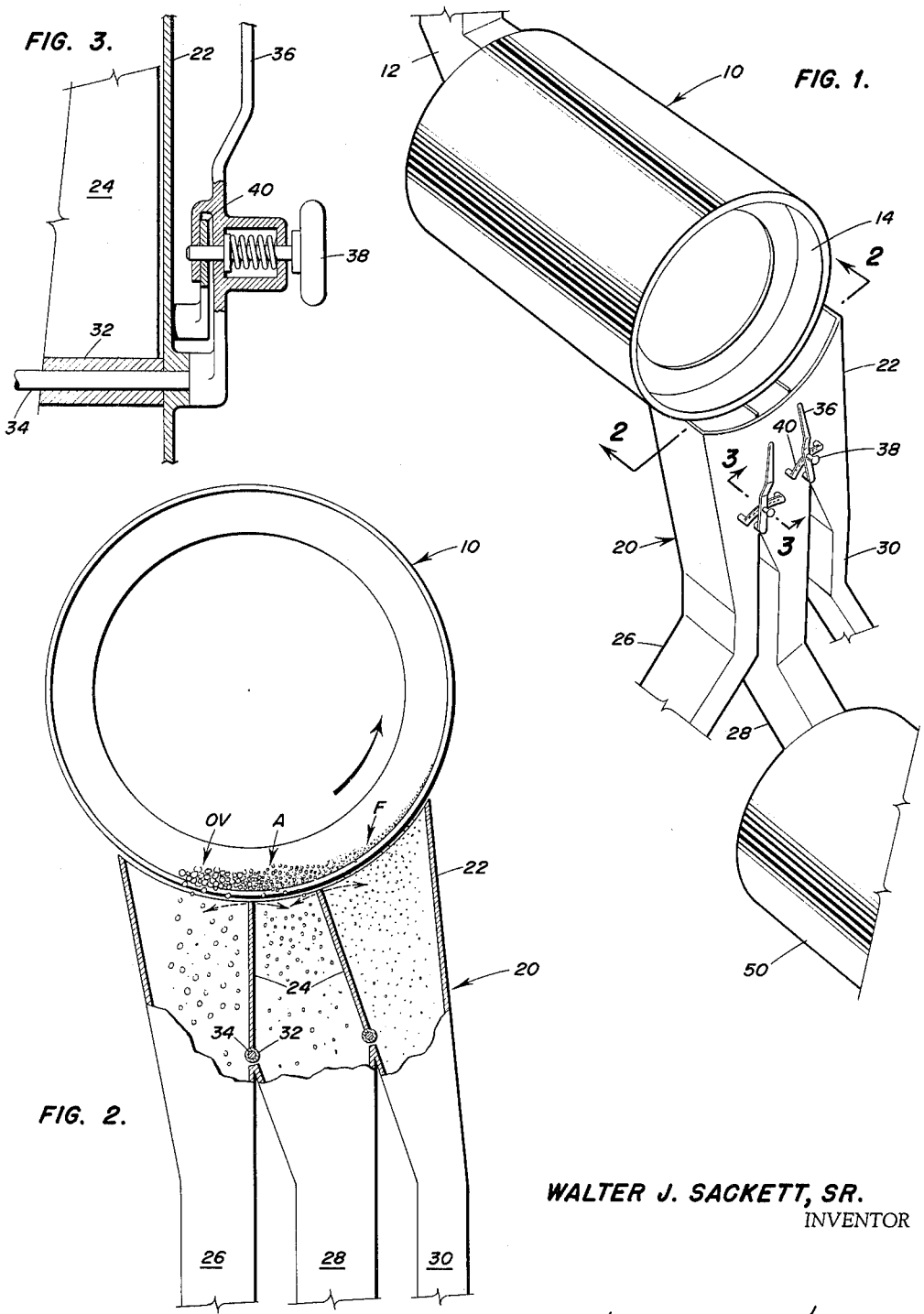
WALTER J. SACKETT, SR.
INVENTOR
BY *Walter G. Finch*
ATTORNEY they are discharged. Consequently, a classification of product occurs and the acceptable product A is received by and directed from the center or acceptable duct 28 into a dryer 50 while the oversize product OV and fines F are directed through their respective ducts 26 and 30 for re-introduction into the granulator 10 through the supply chute 12 for reprocessing while they are still in suitable condition of temperature and moisture.

United States Patent Office 3,239,314
Patented Mar. 8, 1966

3,239,314
AMMONIATOR-GRANULATOR SYSTEM FOR SEPARATING CLASSES OF GRANULES
Walter J. Sackett, Sr., Baltimore, Md., assignor to The A. J. Sackett & Sons Company, Baltimore, Md., a corporation of Maryland
Continuation of abandoned application Ser. No. 93,644, Mar. 6, 1961. This application Feb. 4, 1963, Ser. No. 256,800
1 Claim. (Cl. 23—259.1)

This application is a continuation of U.S. patent application S.N. 93,644, filed March 6, 1961 by applicant, for "Ammoniator-Granulator System for Separating Classes of Granules," now abandoned.

This invention relates generally to classifiers, and more particularly, it pertains to an ammoniator-granulator system which separates its own output of material into several size classes.

A disadvantage of tumbler-barrel types of ammoniator-granulators is their production of a certain quantity of unacceptable size particles. Consequently, the entire output of granulated material is fed to a classifier and is sorted as to size and the unacceptable product returned for reprocessing.

This is a wasteful process since it involves the use of large classifiers capable of handling the entire output of the plant. Furthermore, the material has generally lost heat by the time it is classified and must be brought back to the proper processing temperature with consequent increased expenditure of fuel.

It has been observed that as soon as the granules are formed and while they are still within the granulator, an arrangement of these into particles size begins.

An object of this invention, therefore, is to provide a high output granulator system which sorts its own product and dries only an acceptable product.

Another object of this invention is to provide a combination granulator-classifier which can be adjusted to deliver a desired range of granule size.

Still another object of this invention is to provide a granulator which delivers separately oversize and undersize particles for reprocessing while they still are in a processing condition.

These and other objects and attendant advantages will become more readily apparent and understood from the following detailed specification and single sheet of accompanying drawings in which:

FIG. 1 is a perspective view of an ammoniator-granulator incorporating the novel features of this invention;

FIG. 2 is an end elevation, partly in cross-section, of the ammoniator-granulator taken along the line 2—2 of FIG. 1; and FIG. 3 is a section view taken along the line 3—3 of FIG. 1 showing the details of the adjustable plates.

Referring now to the details of the drawings, the novel granulator of this invention is designated generally in FIGS. 1 and 2 by reference numeral 10. Raw material for mixed goods such as plant foods, fertilizer and the like are introduced to the granulator 10 by a supply chute 12 and treated under heat and moisture simultaneously while being tumbled. At a discharge end 14 of the granulator 10 a fractional separator, designated generally by reference numeral 20, is arranged to encompass a large sector thereof.

The upper portion 22 of this separator 20 is provided with a pair of adjustable vanes or plates 24, shown best in FIG. 2, which divide the separator 20 into three branched channels consisting of an oversize duct 26, an acceptable duct 28, and a fines duct 30.

As shown in FIG. 2, when the granulator 10 rotates in the direction of the curved arrow, small particles of the product or fines F due to their light weight and moisture tend to be carried past its bottom center line.

The majority of the acceptable product A tumbles about near the center line before dropping out and the oversize granules OV tend to pile up behind the acceptable product A before they are discharged. Consequently, a classification of product occurs and the acceptable product A is received by and directed from the center or acceptable duct 28 into a dryer 50 while the oversize product OV and fines F are directed through their respective ducts 26 and 30 for re-introduction into the granulator 10 through the supply chute 12 for reprocessing while they are still in suitable condition of temperature and moisture.

FIGS. 2 and 3 show how the plates 24 are made adjustable by pivot sleeves 32 and shafts 34 fastened to their lower ends. External levers 36 fastened to the shafts 34 are each provided with a quadrant 40 and a lock pin 38 so that any desirable ratio of acceptable product A to the oversize product OV and fines F may be chosen.

Obviously many modifications of the present invention are possible in the light of the above teachings. It is, therefore, to be understood that within the scope of the appended claim the invention may be practiced otherwise than as specifically described.

What is claimed is:

In combination, means including a rotating type granulator for producing granules of various sizes and in which said sizes are classified by the rotation of said granulator and are discharged in a range of granule sizes along the lower periphery of the discharge end thereof, a separator comprising a plurality of adjacent ducts for receiving said range of granule sizes from said granulator, said adjacent ducts having a pivotally mounted plate member forming a common wall between adjacent pairs of said ducts, said plate member being arranged with its upper swingable end terminating beneath and adjacent the lower periphery of the discharge end of said granulator, whereby the opening of each duct is adjustable with respect to said lower periphery to receive the desired portion of the range of granule sizes discharged therefrom, with each plate member having a pivot shaft fastened thereto, a lever for each said plate member and mounted on said pivot shaft to radially extend therefrom exteriorly of said ducts, a quadrant mounted to the exterior of said ducts for each said lever and having apertures spaced therealong, and means for locking each said plate member in a predetermined position between adjacent delivery ducts, said means consisting of a lock pin movably mounted on each said lever and spring-biased to enter the aperture selected of said quadrant to obtain said predetermined position for said plate member.

References Cited by the Examiner
UNITED STATES PATENTS 1,581,430  4/1926  Edmunds et al. ____ 251—301 X
2,892,689  6/1959  Rushford _____ 23—314

FOREIGN PATENTS 153,324  2/1956  Sweden.

MORRIS O. WOLK, *Primary Examiner.*
JAMES H. TAYMAN, Jr., *Examiner.*